United States Patent
Seo et al.

(10) Patent No.: US 7,579,970 B2
(45) Date of Patent: Aug. 25, 2009

(54) TIMING RECOVERY METHODS AND APPARATUSES

(75) Inventors: Il-Won Seo, Yongin-si (KR); Jae-Hwan Ahn, Daejeon (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 671 days.

(21) Appl. No.: 11/314,177

(22) Filed: Dec. 22, 2005

(65) Prior Publication Data
US 2006/0158358 A1      Jul. 20, 2006

(30) Foreign Application Priority Data
Dec. 24, 2004    (KR) .................. 10-2004-0111658

(51) Int. Cl.
*H03M 1/06*      (2006.01)
(52) U.S. Cl. .................................... 341/118; 341/123
(58) Field of Classification Search ............... 341/118, 341/120, 122, 123, 144, 155
See application file for complete search history.

(56) References Cited

U.S. PATENT DOCUMENTS 5,566,213 A * 10/1996 Carsello ................ 375/344
6,795,510 B2 * 9/2004 Edde ..................... 375/326
2003/0215036 A1 11/2003 Ma
2006/0067434 A1 * 3/2006 Kovintavewat et al. ..... 375/340
2006/0078070 A1 * 4/2006 Zhidkov et al. ........... 375/326

FOREIGN PATENT DOCUMENTS

| JP | 2003-228916 | 8/2003 |
| KR | 2000-67974 | 11/2000 |
| KR | 10-2003-0005646 | 1/2003 |
| KR | 10-0398879 | 9/2003 |

OTHER PUBLICATIONS

Korean Office Action dated Jun. 26, 2006.

* cited by examiner

*Primary Examiner*—Brian Young
(74) *Attorney, Agent, or Firm*—Harness, Dickey & Pierce

(57) ABSTRACT

In a timing recovery method, two consecutive sampling values may be generated based on a sampled input signal. The input signal may be sampled according to a phase interval of a sampling clock. A slope between the two consecutive sampling values may be calculated, and a difference between a target slope and the calculated slope may be determined. A phase of the sampling clock may be compensated based on the difference between the target slope and the calculated slope.

25 Claims, 8 Drawing Sheets

WANTED VALUE

SAMPLE VALUE

TIMING RECOVERY METHODS AND APPARATUSES

PRIORITY STATEMENT

This application claims priority under 35 U.S.C. § 119 to Korean Patent Application No. 10-2004-0111658, filed on Dec. 24, 2004 in the Korean Intellectual Property Office (KIPO), the entire contents of which are hereby incorporated by reference.

BACKGROUND

1. Field of the Invention

Example embodiments of the present invention relate to apparatuses and methods of timing recovery. For example, timing recovery apparatuses and/or methods according to one or more example embodiment of the present invention may be used where an input signal has a gain error in a higher noise system and/or when a zero-crossing transition has irregular characteristics.

2. Description of the Related Art

According to the related art, a timing recovery apparatus for determining an initial sampling timing is needed in a receiver of a communication system having lower signal-to-noise ratio (SNR) and/or a read-write head of a mass storage device.

Related art timing recovery apparatuses may use a zero-crossing transition for phase error detection. When using a zero-crossing transition, an arctangent approximation method may be used to approximate a phase compensation value from a phase error value.

FIGS. 1A and 1B are graphs illustrating a related art timing error detection method using the zero-crossing. As shown, a horizontal axis of the graph illustrated in FIG. 1A represents time, and a vertical axis of the graph illustrated in FIG. 1A represents amplitude. In this related art method, an analog input signal may be sampled at expected zero-crossing points in response to a given sampling clock. For example, each input signal may be sampled at every odd numbered sampling point among sampling points having a 90-degree phase interval with respect to one another. The odd numbered sampling points may be represented by the numerals 1, 2, 3 and 4.

In the example illustrated in FIG. 1A, the input signal may be sampled at the expected zero-crossing points, and a timing error may not be detected.

Referring to FIG. 1B, the horizontal axis and the vertical axis of the graph each represent the time and the amplitude of the input signal, respectively, in the same manner as FIG. 1A. As in FIG. 1A, the analog input signal may be sampled at the expected zero-crossing points in response to a given sampling clock. In contrast to FIG. 1A, however, in FIG. 1B the input signal is not sampled at the expected zero-crossing points. That is, for example, at the expected zero-crossing points represented by reference numerals 5, 6, 7 and 8, the input signal is not actually zero. In this case, a phase error is detected.

The phase error may be determined by alternately converting a sign of the input signal value at the sampling points 5, 6, 7 and 8, summing the sampled input signal values and averaging the sum to calculate a quantity of the phase error.

With regard to FIG. 1B, for example, assuming that a sampling value of the input signal sampled at the expected zero-crossing points 5, 6, 7 and 8 is 0.3, −0.3, 0.3 and −0.3, respectively, the phase error is determined based on 0.3, by alternately converting a sign of the 4 sampling values, summing the 4 sampling values, and averaging the sum of the 4 sampling values. In this example, when the average value is a positive value, sampling points may be shifted to the left direction in the time domain. On the other hand, when the average value is a negative value, the sampling points may be shifted to the right direction in the time domain. In either case, the sampling point may be matched to the zero-crossing points at which the value of the input signal is actually zero.

In the related art, the above mentioned arctangent approximation method is used to determine a phase compensation value from the phase error to shift the sampling points collectively along the time axis. The phase compensation value controls a digital clock generator that may generate a sampling clock.

An equation representing the arctangent approximation method may be represented as:

$$\tan(\theta) = \theta \qquad \text{[Equation 1]}$$

As shown in equation 1, the arctangent approximation method may obtain the phase compensation value from the phase error value. For example, the phase compensation value based on the phase error value of 0.3 is approximately 0.3 radians. According to the sign of the phase error value, sampling timing may be increased or decreased.

The approximated phase compensation value according to the arctangent approximation method may be input to a related art digital clock generator, which may generate a sampling clock. A related art digital clock generator may include an oscillator for the sampling clock generation and outputting the sampling clock having the compensated phase in response to the input phase compensation value. As noted above, the output sampling clock may be used to sample the analog input signal.

Conventionally, an initial section of an input signal of a system may include a preamble interval. For example, a preamble interval, such as '1100110011001100', may include two periods of patterns 2-T. This may enable the input signal to maintain a quasi-sine wave in the receiver. As mentioned above, a phase error may be detected by considering the input signal as a sine wave at an expected zero-crossing point based on a sampling value of the input signal in the conventional method.

However, in the related art, the input signal gain may not be considered. Although an automatic gain control (AGC) circuit may control the input signal gain, gain errors may occur. This may result in additional errors due to the gain errors because the conventional arctangent approximation method is carried out at a fixed gain.

In addition, the related art method considers the zero-crossing points to be optimized values and detects the phase error based on the sampled input signals. Channel characteristics of a system are analyzed to cross at zero-crossing points of a preamble interval. However, when the system has non-symmetrical zero-crossing characteristics, other methods may be needed. As such, in the related art, the arctangent approximation method may be applied only when the zero-crossing point is the optimal value.

SUMMARY OF THE INVENTION

Example embodiments of the present invention provide one or more timing recovery methods and/or apparatuses for detecting a phase error of a sampling clock and/or compensating a phase of a sampling clock, for example, in a lower SNR system which may have irregular characteristics of a zero-crossing transition.

In a timing recovery method according to an example embodiment of the present invention, two consecutive sampling values may be generated based on a sampled input signal. The input signal may be sampled according to a phase interval of a sampling clock. A sampling slope corresponding to a difference between the two consecutive sampling values may be calculated, and a phase of the sampling clock may be compensated based on at least a difference between a target slope and the calculated sampling slope.

A timing recovery apparatus according to an example embodiment of the present invention may include a sample decision unit, a slope arithmetic unit, a slope difference unit and a phase compensation unit. The sample decision unit may be configured to generate a first sampling value and a second sampling value based on a sampled input signal. The input signal may be sampled according to a phase interval of a sampling clock. The slope arithmetic unit may be configured to calculate a sampling slope corresponding to a difference between the first sampling value and the second sampling value. The slope difference arithmetic unit may be configured to calculate a difference between a target slope and the calculated sampling slope. The phase compensation unit may be configured to generate a phase compensation signal based on at least the difference between the target slope and the calculated sampling slope.

In example embodiments of the present invention, two consecutive sampling values may be generated based on a plurality of sequential values of the sampled signal selected in response to two consecutive positive values of a sampled signal.

In example embodiments of the present invention, the difference between the target slope and the calculated sampling slope may be divided by a slope interval. The slope interval may be calculated by dividing a difference between a maximum value and a minimum value of the calculated sampling slope by a number of phase compensation steps. The maximum value may be a sum of the two consecutive sampling values and/or the minimum value may be a negative sum of the two consecutive sampling values.

In example embodiments of the present invention, an input signal gain may be calculated by adding two consecutive sampling values, and a gain of the input signal may be compensated based on a difference between the calculated input signal gain and a target gain.

In example embodiments of the present invention, an input signal gain may be calculated by adding the two consecutive sampling values, and the phase of the sampling clock may be compensated based on a ratio of the calculated input signal gain and a target gain, and the difference between the target slope and the calculated slope.

In example embodiments of the present invention, the sample decision unit may be further configured to store the plurality of sequential values in response to, and including, the two consecutive positive values of the sampled input signal, generate the first sampling value based on a first portion of the stored values and generate the second sampling value based on a second portion of the stored values.

In example embodiments of the present invention, the sample decision unit may include a sign decision unit, a shift register, a first average arithmetic unit and second average arithmetic unit. The sign decision unit may be configured to detect when two consecutive positive values of the sampled input signal have been received. The shift register may be configured to store the plurality of sequentially-received values of the sampled input signal in response to the two consecutive positive values. The first average arithmetic unit may be configured to convert all negative values in the first portion of stored values to positive values, average the values in the first portion of stored values to generate a first average value, and output the first average value as the first sampling value. The second average arithmetic unit may be configured to convert all negative values in the second portion of stored values to positive values, average the values in the second portion of stored values to generate a second average value, and output the second average value as the second sampling value.

In example embodiments of the present invention, the timing recovery apparatus may further include a gain arithmetic unit, a gain difference arithmetic unit and a gain compensation unit. The gain arithmetic unit may be configured to calculate an input signal gain corresponding to a sum of the first sampling value and the second sampling value. The gain difference arithmetic unit may be configured to calculate a difference between the calculated input signal gain and a target gain. The gain compensation decision unit may be configured to generate a gain control signal controlling the input signal gain based on the difference between the calculated input signal gain and the target gain.

In example embodiments of the present invention, the timing recovery apparatus may further include a gain arithmetic unit. The gain arithmetic unit may be configured to calculate an input signal gain corresponding to a sum of the first sampling value and the second sampling value. The phase compensation unit may be configured to generate a phase compensation signal based on the difference between the calculated sampling slope and the target slope, the input signal gain, and a target gain.

In example embodiments of the present invention, the phase compensation unit may multiply the target slope by a ratio of the calculated input signal gain to a target gain to compensate the target slope, and divide the difference between the target slope and the calculated sampling slope by a slope interval to generate the phase compensation signal.

BRIEF DESCRIPTION OF THE DRAWINGS

The present invention will become more apparent by describing in detail example embodiments of the present invention as illustrated in the accompanying drawings, in which.

DESCRIPTION OF EXAMPLE EMBODIMENTS OF THE PRESENT INVENTION

Figure 1A:
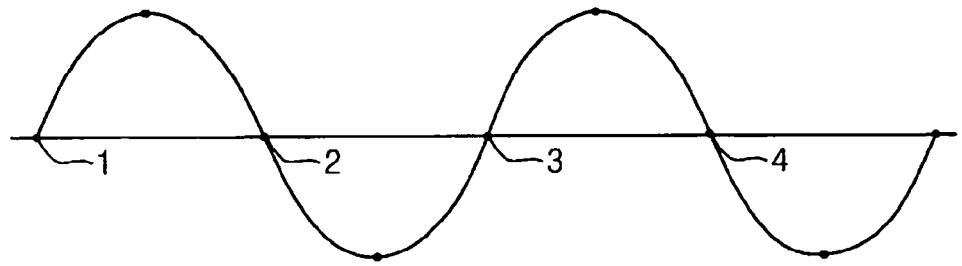
FIG. 1A and FIG. 1B are graphs illustrating a related art timing error detection method using a zero-crossing.
Figure 1B:
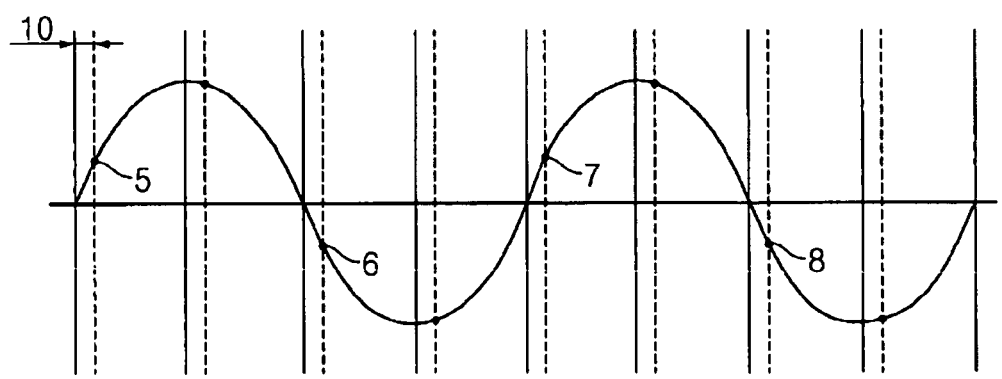

Detailed illustrative embodiments of the present invention are disclosed herein. However, specific structural and functional details disclosed herein are merely representative for purposes of describing example embodiments of the present invention. This invention may, however, be embodied in many alternate forms and should not be construed as limited to the embodiments set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks might occur out of the order noted in the flowcharts. For example, two blocks shown in succession may in fact be executed substantially concurrently or the blocks may sometimes be executed in the reverse order, depending upon the functionality/acts involved.

In an example embodiment of the present invention, a phase error may be detected by simplifying the input signal waveform to a triangle wave, and using a slope between a sampling value at the expected zero-crossing point and a sampling value at a point delayed by a quarter of a period from the expected zero-crossing point.

Figure 2:
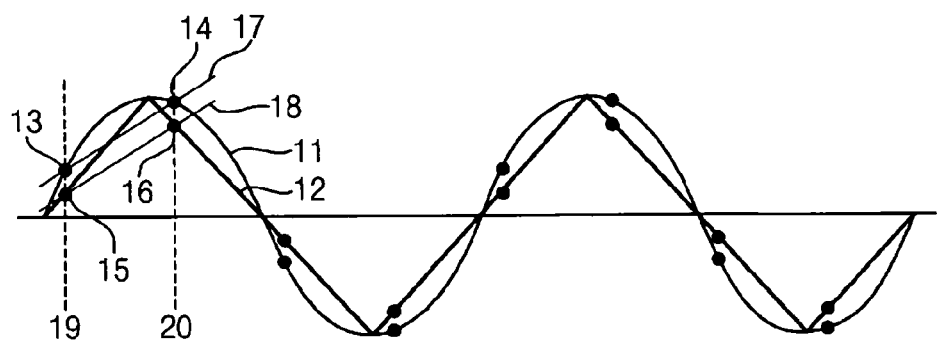
FIG. 2 is a graph illustrating a timing error detection method according to an example embodiment of the present invention.

FIG. 2 is a graph illustrating a timing error detection method according to an example embodiment of the present the invention considering an input signal as, for example, a triangle wave.

Referring to FIG. 2, an actual input signal 11 having a sine wave and triangle wave 12 approximation of the input signal (e.g., an input signal having a triangle wave), according to an example embodiment of the present invention, are superimposed. As shown, a peak point of the sine wave may be equal to a peak point of the triangle wave. As indicated from a difference between the sine wave and the triangle wave, at the same sampling points 19 and 20, sampling values 13 and 14 of the actual sine wave input signal 11 may differ (e.g., substantially) from sampling values 15 and 16 of the triangle wave input signal 12.

However, a slope 17 between sampling values 13 and 14 may be similar, or substantially similar, to a slope 18 between sampling values 15 and 16. One or more example embodiments of the present invention may detect a timing error using a slope between the sampling values of the triangle wave input signal 12 instead of, or in combination with, the sampling values of the sine wave input signal 11.

A phase error compensation method according to an example embodiment of the present invention is described with regard to an example case in which the input signal does not include a gain error.

Figure 3A:
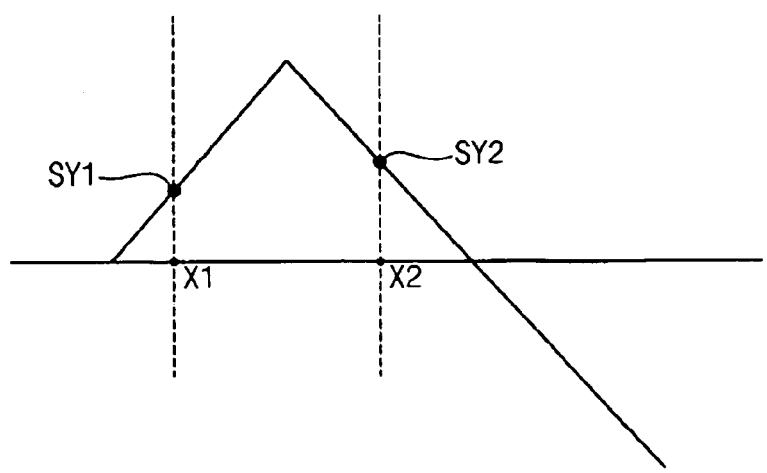
FIG. 3A, FIG. 3B, and FIG. 3C are graphs illustrating a method for detecting a phase error according to an example embodiment of the present invention.
Figure 3B:
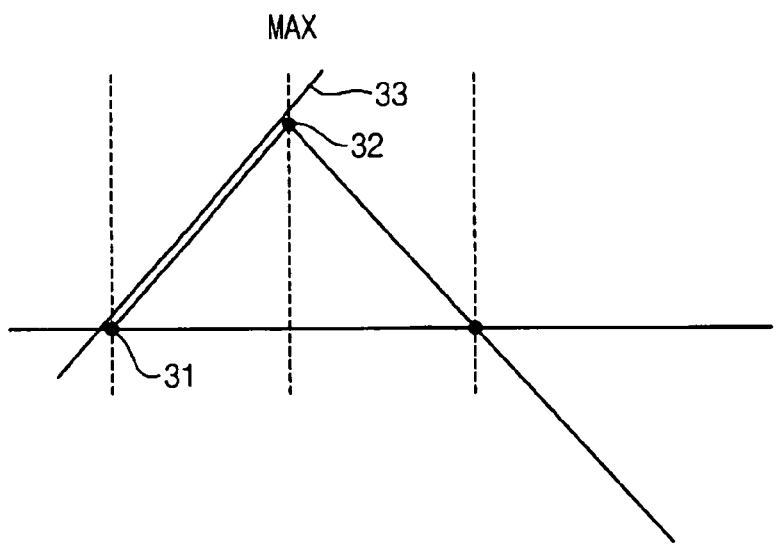
Figure 3C:
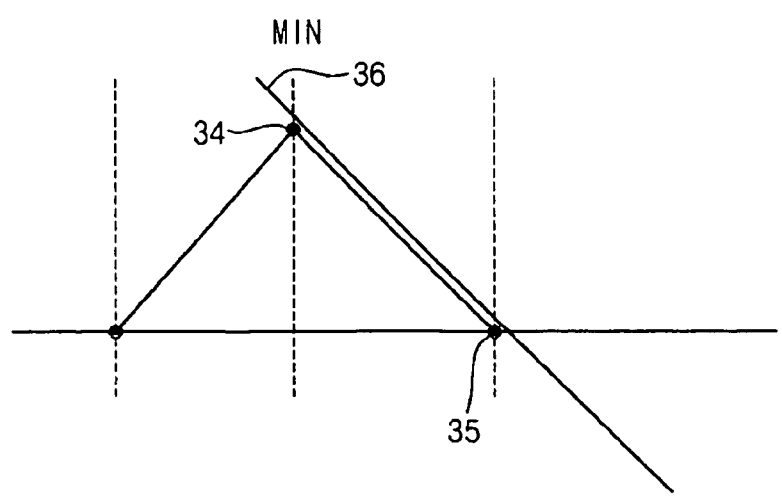

FIG. 3A, FIG. 3B, and FIG. 3C are graphs illustrating a method for detecting a phase error according to an example embodiment of the present invention.

Referring to FIG. 3A, the horizontal axis represents a time axis, and the vertical axis represents amplitude of an input waveform. In an example embodiment of the present invention, an analog input signal may be sampled at an expected zero-crossing point X1 and at a point X2 delayed for a given portion period of the input signal. For example, the delayed point X2 may be delayed for a quarter of a period from the expected zero-crossing point X1. The quarter of the period may be based on a period of the sine wave in the 2-T preamble interval as mentioned above. In this example, sampling values of the input signal at each sampling point X1 and X2 may be SY1 and SY2.

Assuming, for example purposes, that a sampling interval of X2−X1 is 1, the slope between SY1 and SY2 may be equal, or substantially equal, to the difference between SY2 and SY1, or SY2−SY1. In addition, the maximum value of the analog input signal may be equal, or substantially equal to, the sum of SY1 and SY2 or SY1+SY2. Based on the maximum value obtained by adding the two sampling values SY1 and SY2, the maximum slope value and the minimum slope value may be calculated.

FIG. 3B is a graph illustrating an example case in which a slope 33 between two sampling values has a maximum value. In this example, a first sampling value 31 may be '0' and a second sampling value 32, delayed for a given portion of a period (e.g., a quarter of a period) from the first sampling value 31, may be equal, or substantially equal to, SY1+SY2, or the maximum sampling value at the peak point of the analog input signal. The maximum value of the slope 33 obtained from two sampling values may be the sum of the two sampling values, SY1+SY2.

FIG. 3C is a graph illustrating an example case in which a slope 36 between two sampling values has a minimum value. In this example, the first sampling value 34 may be SY1+SY2, or the maximum sampling value at the peak point of the analog input signal, and the second sampling value delayed for a given period (e.g., a quarter of a period) from the first sampling value, may be '0'. The minimum value of the slope 36 obtained from two sampling values may be a negative sum of the two sampling values, or −(SY1+SY2).

Methods for detecting phase error according to one or more example embodiments of the present invention may begin when two sequential sampling values are positive numbers, and thus, the two sampling values may be assumed to positive numbers.

In this example case, a phase compensation value may be calculated using a difference between the slope obtained from the two sampling values SY2−SY1, and a target slope Y2−Y1. The target slope may be calculated independently, provided from an external source and/or calculated to reduce (e.g., minimize) the phase error of the input signal.

For example, with regard to FIG. 3B, the target slope Y2−Y1, may be a maximum slope value SY1+SY2 corresponding to the example case in which the first sampling value 31 is the zero-crossing point. If the zerocrossing transition has irregular characteristics, for example in a partial response maximum likelihood (PRML) system, the target slope Y2−Y1 may have a different value. One or more example embodiments of the present invention may be adaptable for in these example cases.

Calculating a phase compensation value from the difference between the slopes calculated using the two sampling values SY2 and SY1, and the target slope Y2−Y1, may be related to a number of steps for phase control of a digital clock generator that may generate a sampling clock. For example, if the phase control of the digital clock generator is designed to adjust a sampling interval (e.g., a quarter of the 2-T period) to 32 steps, a slope interval may be obtained by sampling represented in equation 2 shown below:

$$\frac{(\text{MAX SLOPE} - \text{MIN SLOPE})}{32} = \frac{2 \times (SY1 + SY2)}{32} \quad \text{[Equation 2]}$$

As shown in equation 2, the slope obtained by a sampling may be varied from the minimum slope −(SY1+SY2) to the maximum slope SY1+SY2 at intervals of (SY1+SY2)/16. In this example case, a phase compensation value may be determined using equation 3 below:

$$\frac{(\text{SAMPLING SLOPE} - \text{TARGET SLOPE})}{\text{SLOPE INTERVAL}} = \quad \text{[Equation 3]}$$
$$\frac{(\text{SAMPLING SLOPE} - \text{TARGET SLOPE})}{\frac{SY1 + SY2}{16}}$$

The phase compensation value calculated by Equation 3 may refer to a phase step selected by the digital clock generator. For example, when the phase compensation value is positive, a phase of the sampling clock may be shifted to the right (e.g., a phase delay). When the phase compensation value is negative, a phase of the sampling clock may be shifted to the left (e.g., a phase lead). As discussed above, if the phase control of the digital clock generator is designed to adjust the sampling interval (e.g., a quarter of 2-T period) to 32 steps, the phase compensation value may be between about −16 and 16, inclusive.

In one or more example embodiments of the present invention a digital clock generator may control the phase of the sampling clock. However, any suitable a sampling clock generator having any suitable configuration may be used. In these cases, a phase compensation value may be calculated using a difference between a slope obtained from two sampling values using any other suitable method and a target slope.

A phase error compensation method, according to one or more example embodiments of the present invention, will now be explained with regard to an example case in which the input signal has a gain error.

As discussed above, the method for the phase error detection may be based on the assumption that an input signal gain is equal, or substantially equal, to the expected gain. For example purposes, it may be assumed that the maximum value and the minimum value of the target slope are equal, or substantially equal, to the maximum value and the minimum value of the slope obtained from two sampling values.

Since the actual input signal has a gain error, if the actual input signal gain differs from the expected input signal gain, the target slope may be controlled based on the ratio of the actual input signal gain and the expected input signal gain.

For example, the actual input signal gain may he sum of the two sampling values SY1+SY2 and the expected input signal gain may be Y1+Y2. In this example, the target slope may be compensated, for example, by multiplying the target slope by a ratio of the input signal gain to the expected input signal gain. The phase compensation value may be calculated using the compensated target slope. The compensated target slope may be adapted to the gain error, such as, show in equation 4.

$$\frac{(SY2 - SY1) - (Y2 - Y1) \times \frac{SY1 + SY2}{Y1 + Y2}}{\frac{(SY1 + SY2)}{16}} \quad \text{[Equation 4]}$$

As shown, equation 4 illustrates that the target slope (Y2−Y1) may be compensated by a ratio of the input signal gain SY1+SY2 to the expected input signal gain Y1+Y2. The other parts excepting for the compensated target slope (Y2−Y1)× ((SY1+SY2)/(Y1+Y2)) are equal to those of FIG. 3.

In one or more example embodiments of the present invention, the actual input signal gain SY1+SY2 and the expected input signal gain Y1+Y2 may be used to generate a gain control signal. The gain control signal may control an AGC circuit, which may adjust an input signal gain.

Figure 4A:
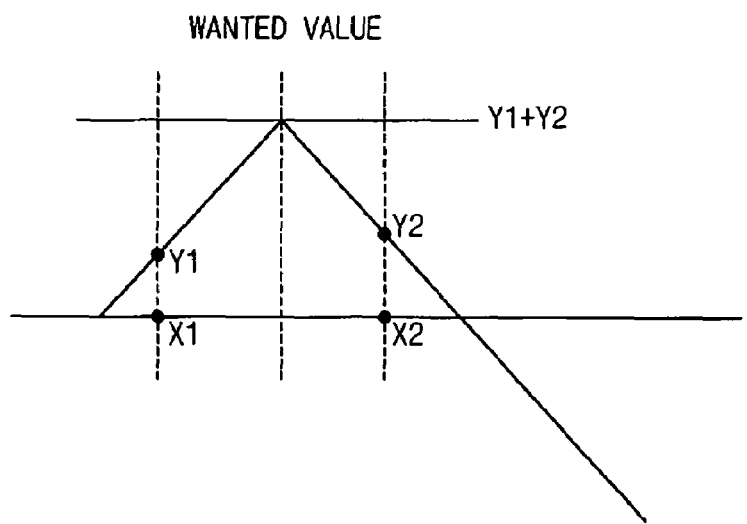
FIG. 4A and FIG. 4B are graphs illustrating gain error detection according to an example embodiment of the present invention.
Figure 4B:
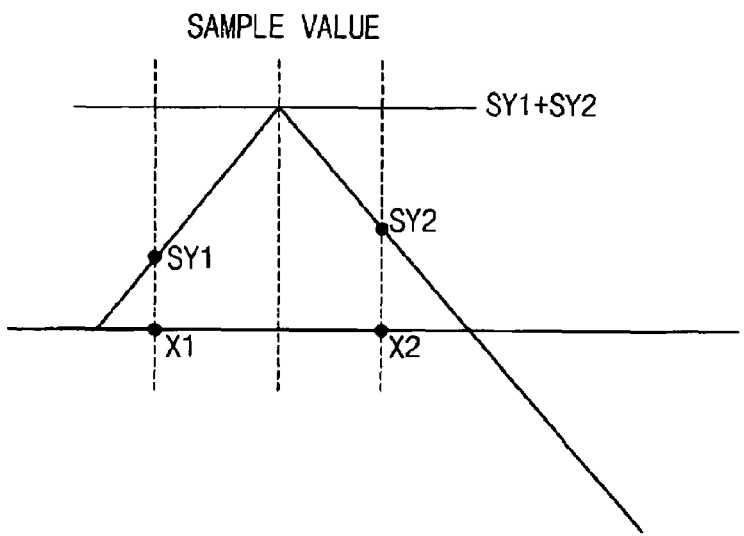

FIG. 4A and FIG. 4B arc graphs illustrating a method for detecting gain error according to an example embodiment of the present invention. Referring to FIG. 4A, the expected input signal gain Y1+Y2 may be calculated by adding target sampling values Y1 and Y2 forming the target slope. Referring to FIG. 4B, the actual input signal gain SY1+SY2 may be calculated by adding the two sampling values SY1 and SY2.

The gain control signal for the AGC circuit may be calculated using a difference between the actual input signal gain SY1+SY2 and the expected input signal gain Y1+Y2. Representing (e.g., approximating) the input signal as a triangle wave, according to one or more example embodiments of the present invention, may allow the gain control to be generated more quickly.

Figure 5:
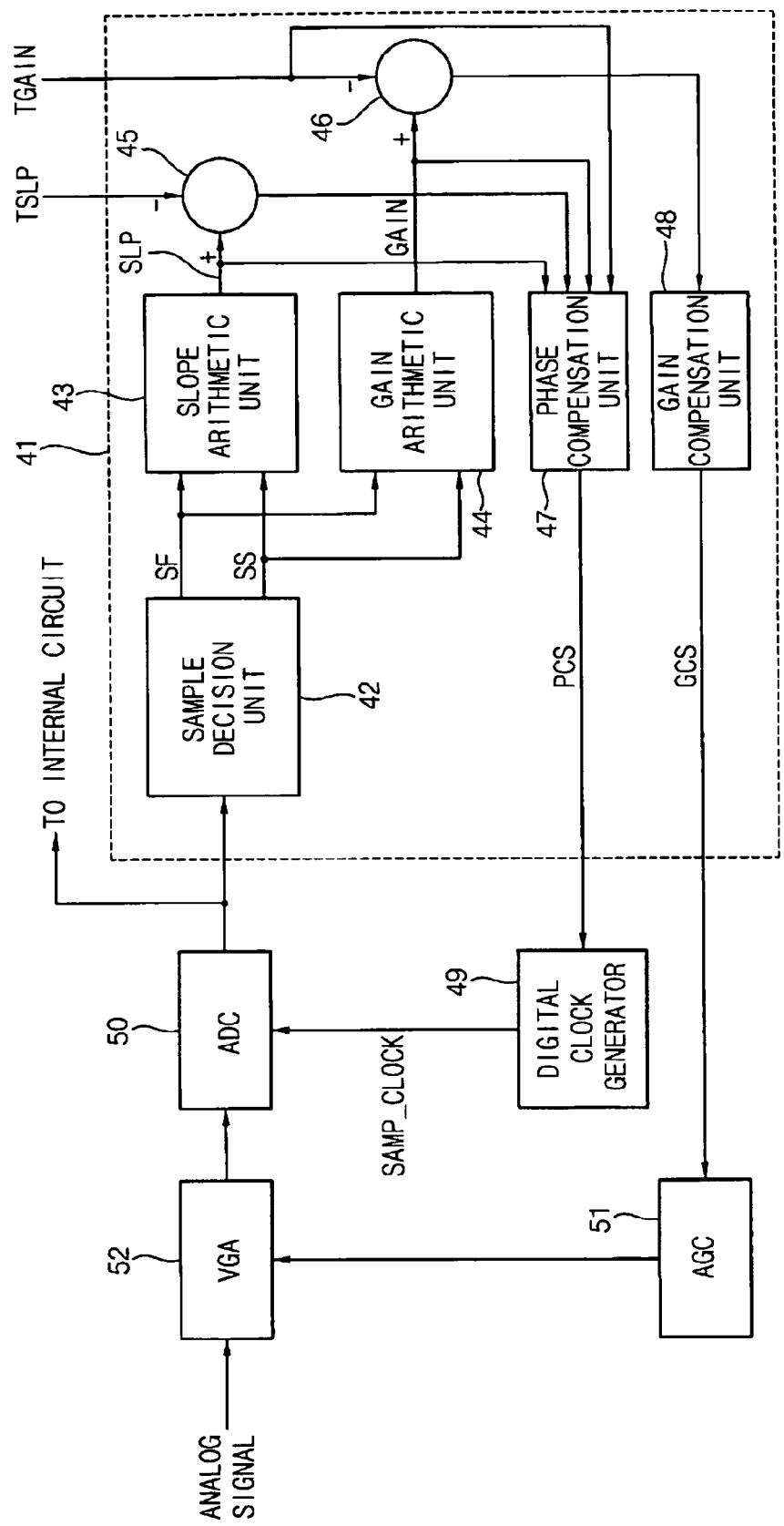
FIG. 5 is a block diagram illustrating a timing recovery apparatus according to an example embodiment of the present invention.

FIG. 5 is a block diagram illustrating a timing recovery apparatus according to an example embodiment of the present invention. As shown, the timing recovery apparatus 41 may include a sample decision unit 42, a slope arithmetic unit 43, a gain arithmetic unit 44, a slope difference arithmetic unit 45 and/or a phase compensation unit 47.

Although not necessarily included in timing recover apparatuses according to one or more example embodiments of the present invention, a digital clock generator 49, an analog-to-digital converter (ADC) 50, an automatic gain control (AGC) circuit 51, and a variable gain amplifier (VGA) 52 are also illustrated in FIG. 5 to assist in explaining example operations of the timing recovery apparatus 41.

In an example operation, the sample decision unit 42 may receive a sampled input signal from the ADC 50 and determine sampling values SS and SF. The sampling values SS and SF may be used to detect a phase error.

As discussed above, in methods for detecting phase error, according to one or more example embodiments of the present invention, the two sampling values SS and SF may be assumed to be positive values. In this example case, the sample decision unit 42 may receive (e.g., sequentially receive) the sampled input signal from the ADC 50 and may determine a first sampling value SF and a second sampling value SS. The first and second sampling values SF and SS may be used to calculate a sampling slope SLP.

The sample decision unit 42, according to one or more example embodiments of the present invention, may be configured to obtain the first sampling value SF and the second sampling value SS more stably than related art timing recover apparatuses.

Figure 6:
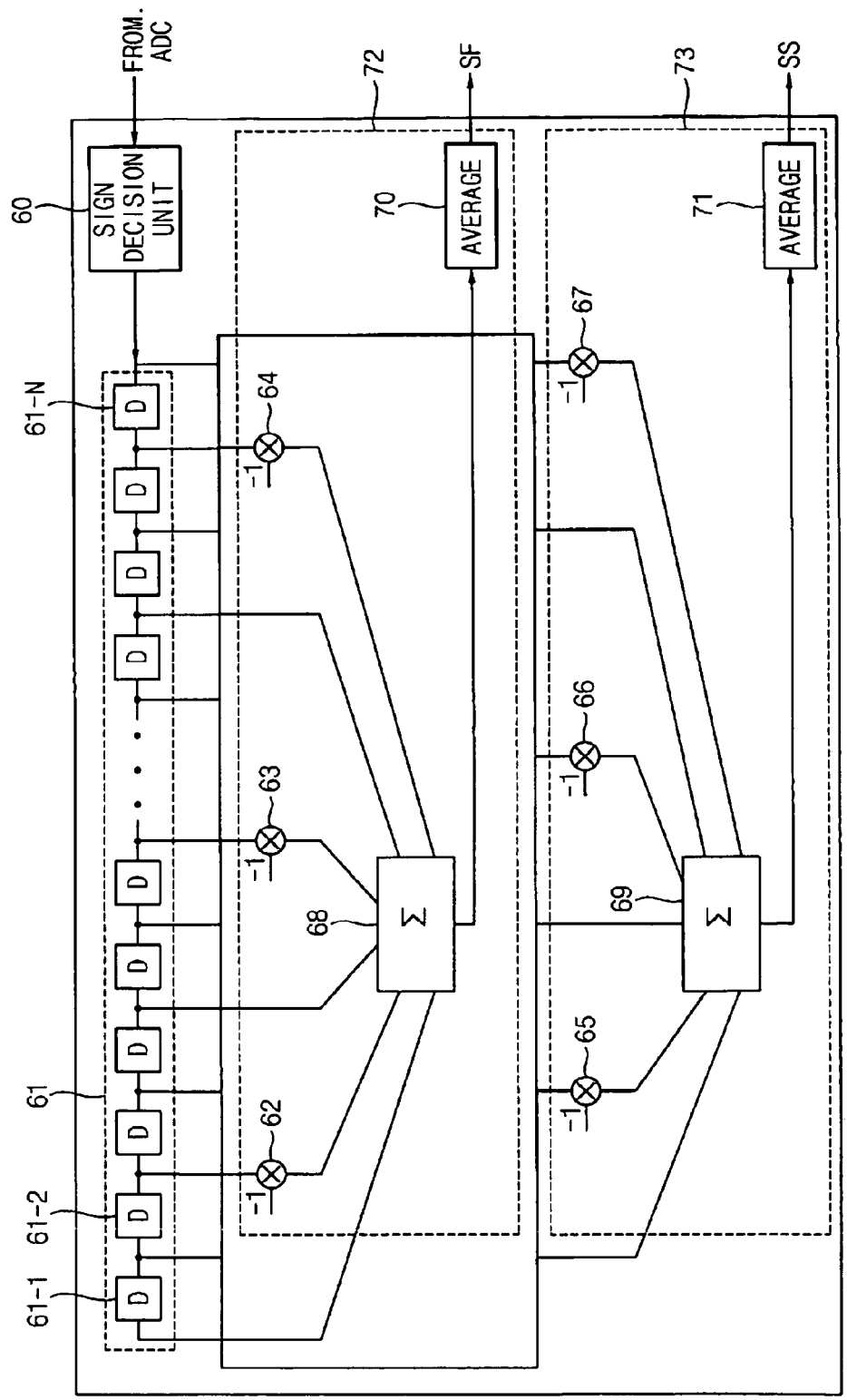
FIG. 6 is a block diagram illustrating a sample decision unit that may be used in the timing recovery apparatus according to an example embodiment of the present invention.

FIG. 6 illustrates a sample decision unit 42 according to an example embodiment of the present invention. The sample decision unit of FIG. 6 may be configured to obtain the first sampling value SF and the second sampling SS value using, for example, an average value of a plurality of (e.g., eight) sampling values. However, the sample decision unit 42 may be configured to output two sampling values having continuously positive values as the first sampling value SF and the second sampling value SS.

The slope arithmetic unit 43 may receive the first sampling value SF and the second sampling value SS from the sample decision unit 42 and may calculate the sampling slope SLP between the first sampling value SF and the second sampling value SS.

The gain arithmetic unit 44 may receive the first sampling value SF and the second sampling value SS from the sample decision unit 42 and may calculate the actual input signal gain GAIN by adding the first sampling value SF and the second sampling value SS.

The slope difference arithmetic unit 45 may receive a target slope TSLP, for example, from an external source, and may receive the sampling slope SLP from the slope arithmetic unit 43. The slope difference arithmetic unit 45 may subtract the target slope TSLP from the sampling slope SLP and output the difference to the phase compensation arithmetic unit 47.

The phase compensation arithmetic unit 47 may perform an operation, for example, as shown in Equation 3 and/or Equation 4 to obtain a phase compensation value. The phase compensation value may be output to the digital clock generator 49 as a phase compensation signal PCS.

In one example, if the input signal does not have a gain error, the phase compensation arithmetic unit 47 may calculate the phase compensation value based on the difference between the sampling slope SLP and the target slope TSLP, the actual input signal gain GAIN, and the number of compensation steps (e.g., 32) The phase compensation value may then be output to the digital clock generator 49 as a phase compensation signal PCS. In this example, the phase compensation arithmetic unit 47 may calculate the phase compensation value using Equation 3.

If the input signal does include a gain error, the phase compensation arithmetic unit 47 may calculate the phase compensation value based on the sampling slope SLP, the target slope TSLP, the actual input signal gain GAIN, the target gain TGAIN and the number of compensation steps (e.g., 32). The phase compensation value may be output to the digital clock generator 49 as a phase compensation signal PCS. In this example, phase compensation arithmetic unit 47 may calculate the phase compensation value using Equation 4.

The digital clock generator 49 may receive the phase compensation signal PCS from the phase compensation arithmetic unit 47 to control a phase of the sampling clock SAMP_CLOCK generated in the digital clock generator 49.

In another example embodiment of the present invention, the timing recovery apparatus 41 may further include a gain difference arithmetic unit 46 and/or a gain compensation decision unit 48. A timing recovery apparatus including gain difference arithmetic unit 46 and/or a gain compensation decision unit 48 may generate a gain control signal GCS for controlling the AGC circuit 51. The gain control signal GCS may he calculated using the difference between an actual input signal gain GAIN calculated at the gain arithmetic unit 44 and the expected input signal gain TGAIN from an external source.

For example, the gain difference arithmetic unit 46 may calculate the difference between the target gain TGAIN from an external source and the actual input signal gain GAIN from the gain arithmetic unit 44. The calculated difference may be output to the gain compensation unit 48.

The gain compensation decision unit 48 may receive the difference between the actual input signal gain GAIN and the target gain TGAIN and may output the gain control signal GCS. The automatic gain control AGC circuit 51 may control the input signal gain GAIN using the variable gain amplifier (VGA) 52 in response to a gain control signal GCS output from the gain compensation decision unit 48.

FIG. 6 is a block diagram illustrating a sample decision unit according to an example embodiment of the present invention. The sample decision unit according to an example embodiment of the present invention may be used in the timing recovery apparatus according to one or more example embodiments of the present invention.

Referring to FIG. 6, the sample decision unit 42 may have a configuration suitable for more stably calculating a first sampling value (e.g., sampling value SF) and a second sampling value (e.g., sampling value SS), which may be used to calculate a slope (e.g., slope SLP) by averaging several sampling values. However, it will be understood that the sample decision unit 42 may be configured in various other ways.

As shown in FIG. 6, the sample decision unit 42 may include a sign decision unit 60, a shift register 61, a first average arithmetic unit 72, and/or a second average arithmetic unit 73. The first average arithmetic unit 72 may further include sign converters 62, 63, 64, an adder 68, and/or a divider 70. The second average arithmetic unit 73 may be configured to include sign converters 65, 66, 67, an adder 69, and/or a divider 71.

In example operation, the sign decision unit 60 may receive a sampled input signal from an ADC (e.g., ADC 50 of FIG. 5), and may detect when two sequential, positive sampling values are received. When the sign decision unit 60 detects two positive, sequential sampling values, the two sequential, positive sampling values and a set number of subsequent sampling values may be received and saved in the shift register 61. The number of sampling values which may be stored in the shift register 61 may correspond to the number of registers included therein.

In example embodiments of the present invention, the number of registers included in the shift register 61 may vary. For example, the shift register 61 may be configured to include 16 registers. In this example, the shift register 61 may receive 16 sampling values (e.g., sequentially), the first sampling value SF may be obtained by using 8 of the 16 sampling values and the second sampling value SS may be obtained by using the remaining 8 sampling values. However, the shift register 61 may include any suitable number of shift register, for example, 8, 16, 32, 64, etc.

In an example case in which the shift register 61 includes 16 registers 61-1, 61-2, . . . , 61-16, sampling values stored in each odd-numbered register (e.g., first register 61-1, third register 61-3, etc.) may be added by the adder 68. If the sampling values of the odd-numbered registers are positive, the values of the odd-numbered registers may be added in the adder 68 without sign converting. If the values of the odd-numbered registers are negative, the sampling values stored in the odd-numbered registers may be sign converted into positive values by the sign converters 62, 63 and 64. The sign converted sampling values may be added in the adder 68.

The divider 70 may calculate the first sampling value SF by dividing the result from the adder 68 by the number of sampling values added by the adder 68. The number of sampling values added by the adder 68 may correspond to the number of registers supplying sampled values to the adder 68. In the above example, 8 sampled values have been supplied by 8 registers, and thus, the divider 70 may divide the output of the adder 68 by a value of 8.

Similarly, sampling values stored in each even-numbered register (e.g., second register 61-1, fourth register 61-3, etc.) may be added by the adder 69. If the sampling values of the even-numbered registers are positive, the values of the even-numbered registers may be added in the adder 69 without sign converting. If the values of the even-numbered registers are negative, the sampling values stored in the even-numbered registers may be sign converted into positive values by the sign converters 65, 66 and 67. The sign converted sampling values may be added in the adder 69.

The divider 71 may calculate the second sampling value SS by dividing the result from the adder 69 by the number of sampling values added by the adder 69. The number of sampling values added by the adder 69 may correspond to the number of registers supplying sampled values to the adder 69. In the above example, 8 sampled values have been supplied by 8 registers, and thus, the divider 71 may divide the output of the adder 69 by a value of 8.

As illustrated in FIG. 5, the first sampling value SF and the second sampling value SS output from the dividers 70 and 71 may be input to the slope arithmetic unit 43 and the gain arithmetic unit 44, and may be used to calculate the sampling slope SLP and the actual input signal gain GAIN, respectively.

Figure 7A:
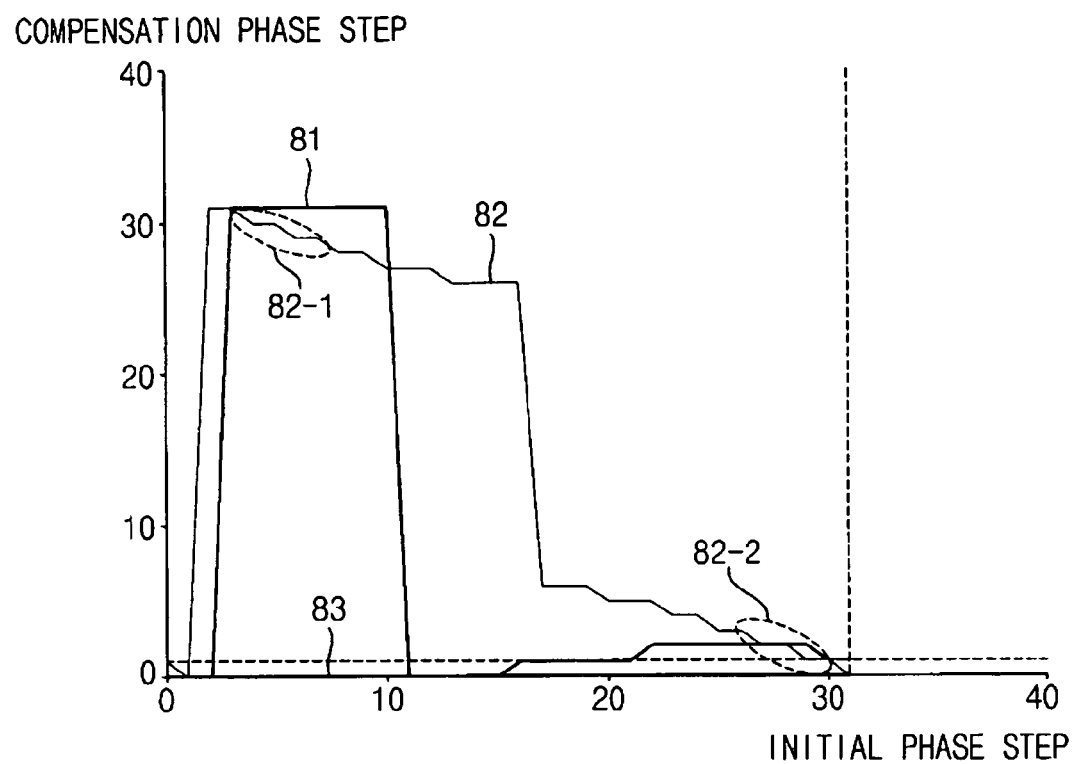
FIG. 7A is a graph comparing simulation test results from applying the timing error detection methods without a gain error according to the conventional method and an example embodiment of the present invention.

FIG. 7A is a graph comparing simulation test results using methods for detecting timing error without a gain error according to the related art method and one or more example embodiments of the present invention.

Referring to the FIG. 7A, the simulation test results using a timing error detection method according to an example embodiment of the present invention are denoted by 81; simulation test results using the related art arctangent approximation method are denoted by 82; and simulation test results using an ideal method that mathematically calculates the actual arctangent and detects the timing error are denoted by 83.

A horizontal axis of FIG. 7A illustrates an initial phase step of a sampling clock, which may be generated by the digital clock generator 49. For example, an initial phase step selected from among phase steps varying from 0 to 31 and according to the sampling clock generated by the digital clock generator 49 capable of controlling the phase with 32 steps.

A vertical axis of the FIG. 7A illustrates a phase step compensated by timing error detection. For example, a phase step selected from among phase steps (e.g., varying from 0 to 31) for compensating the phase of the sampling clock. The phase of the sampling clock may be generated in the digital clock generator 49 capable of controlling the phase of the sampling clock with 32 steps based on the timing error detection and the timing error compensation. The simulation test results are based on an assumption that the compensated phase step is 0.

Referring to FIG. 7A, in an ideal case in which the timing error is calculated by mathematical calculation of the actual arctangent 83, regardless of the value an initial phase step (e.g., regardless of the phase step of the sampling clock, which may vary from 0 to 31), the compensated phase step is calculated at 0.

In a case in which the related art timing error detection method is applied, the start point for calculating the compensated phase step may be about or near an initial phase step of 0 or 31 as denoted by 82-1 and 82-2, respectively, and the compensated phase step may be approximately 0. In this example, the greater the difference between the initial phase step and the target phase step is, the more the performance for reducing the timing error may be degraded.

In a case of applying a timing error detection method according to one or more example embodiments of the present invention, the performance for reducing the timing error may approximate an ideal case in which the timing error may be calculated by mathematical calculation of the actual arctangent. For example, regardless of the initial phase step of the sampling clock (e.g., varying from 0 to 31), the compensated phase step may be calculated at 0 or 31.

Figure 7B:
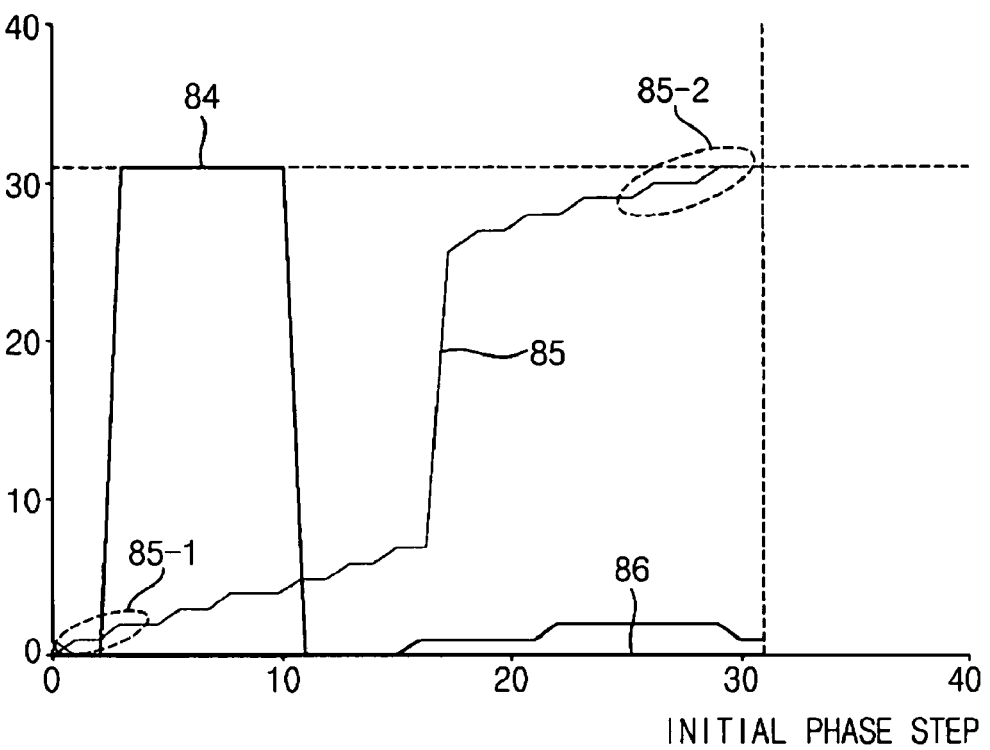
FIG. 7B is a graph comparing simulation test results applying the timing error detection methods with a gain error according to the conventional method and an example embodiment of the present invention.

FIG. 7B is a graph comparing simulation test results applying the timing error detection methods with a gain error according to the related art methods and an example embodiment of the present invention.

Different from FIG. 7A, FIG. 7B illustrates a case in which the actual input signal gain is less than the expected gain. For example, FIG. 7B illustrates the timing error detection when the expected gain is 1, whereas the actual input signal gain is 0.4.

As shown, the simulation test results using the timing error detection method according to one or more example embodiments of the present invention are denoted by 84; simulation test results using the related art arctangent approximation method are denoted by 85; and simulation test results using an ideal method that mathematically calculates the actual arctangent and detects the timing error are denoted by 86.

As mentioned in FIG. 7A, a horizontal axis of FIG. 7B represents the initial phase step, and a vertical axis of FIG. 7B represents the compensated phase step. The simulation test results of FIG. 7B are based on an assumption that the compensated phase step is 0.

Referring to FIG. 7B, in an ideal case in which the timing error is calculated by mathematical calculation of the actual arctangent, regardless of the value of the initial phase step received (e.g., regardless of the initial phase step of the sampling clock varying from 0 to 31), the compensated phase step may be calculated at 0. In this example, the simulation test result may be equal, or substantially equal, to the result of FIG. 7A, assuming that there is no gain error.

In a case in which the related art timing error detection methods are applied, the start point for calculating the compensated phase step is about or near a phase step of 0 (as denoted by 85-1) or 31 (as denoted by 85-2) and the compensated phase step may be 0. In this case, the more the initial phase step differs from the target phase step, the more the performance for reducing the timing error is reduced. In addition, compared to the test result of FIG. 7A, assuming that there is no gain error, the performance for reducing the timing error may be reduced and/or the characteristics of the compensated phase step may be opposite to those of FIG. 7A.

In a case of applying the timing error detection method, according to one or more example embodiments of the present invention, the performance for reducing the timing error may approximate an ideal case in which the timing error is calculated by mathematical calculation of the actual arctangent. For example, regardless of the initial phase step of the sampling clock (e.g., varying from 0 to 31) the phase step compensation may be calculated at 0 or 31. In this example, the simulation test result may be equal, or substantially equal, to the result of FIG. 7A.

Although example embodiments of the present invention are described with respect to a triangle wave, it will be understood that any suitable wave approximation may be used.

While the example embodiments of the present invention have been described, it should be understood that various changes, substitutions and alterations might be made herein without departing from the scope of the invention.

What is claimed is:

1. A timing recovery method comprising:
  generating two consecutive sampling values based on a sampled input signal, the input signal being sampled according to a phase interval of a sampling clock;
  calculating a sampling slope corresponding to a difference between the two consecutive sampling values; and
  compensating a phase of the sampling clock based on at least a difference between a target slope and the calculated sampling slope; wherein generating the two consecutive sampling values includes,
    detecting when two consecutive values of the sampled input signal are positive, and
    generating the two consecutive sampling values based on a plurality of sequential values of the sampled input signal selected in response to the two consecutive positive values.

2. The timing recovery method of claim 1, wherein compensating the phase of the sampling clock includes,
  dividing the difference between the target slope and the calculated sampling slope by a slope Interval to produce a phase compensation value, the slope Interval being calculated by dividing a difference between a maximum value and a minimum value of the calculated sampling slope by a number of phase compensation steps.

3. The timing recovery method of claim 2, wherein the maximum value is a sum of the two consecutive sampling values and the minimum value is a negative sum of the two consecutive sampling values.

4. The timing recovery method of claim 1, further comprising:
  calculating an input signal gain by adding the two consecutive sampling values; and
  compensating a gain of the input signal based on a difference between the calculated input signal gain and a target gain.

5. A timing recovery method comprising:
  generating two consecutive sampling values based on a sampled input signal, the input signal being sampled according to a phase interval of a sampling clock;
  calculating a sampling slope corresponding to a difference between the two consecutive sampling values;
  compensating a phase of the sampling clock based on at least a difference between a target slope and the calculated sampling slope;
  calculating an input signal gain by adding the two consecutive sampling values; and
  multiplying the target slope by a ratio of the calculated input signal gain to a target gain to compensate the target slope; wherein
  the phase of the sampling clock is compensated based on the difference between the compensated target slope and the calculated sampling slope.

6. The timing recovery method of claim 5, wherein generating two consecutive sampling values includes:
  detecting when two consecutive values of the sampled input signal are positive; and
  generating the two consecutive sampling values based on a plurality of sequential values of the sampled signal selected in response to the two consecutive positive values.

7. The timing recovery method of claim 5, wherein compensating the phase of the sampling clock includes,
  dividing the difference between the compensated target slope and the calculated sampling slope by a slope interval to produce a phase compensation value, the slope interval being calculated by dividing a difference between a maximum value and a minimum value of the calculated sampling slope by a number of phase compensation steps.

8. The timing recovery method of claim 7, wherein the maximum value is a sum of the two consecutive sampling values and the minimum value is a negative sum of the two consecutive sampling values.

9. The timing recovery method of claim 5, further comprising:
  calculating a difference between the calculated input signal gain and a target gain; and
  compensating a gain of the input signal using the difference between the calculated input signal gain and the target gain.

10. A timing recovery apparatus comprising:
  a sample decision unit configured to generate a first sampling value and a second sampling value based on a sampled Input signal, the input signal being sampled according to a phase interval of a sampling clock;
  a slope arithmetic unit configured to calculate a sampling slope corresponding to a difference between the first sampling value and the second sampling value;
  a slope difference arithmetic unit configured to calculate a difference between a target slope and the calculated sampling slope; and
  a phase compensation unit configured to generate a phase compensation signal based on at least the difference between the target slope and the calculated sampling slope, wherein the sample decision unit is configured to,
    detect when two consecutive values of the sampled input signal are positive, and
    generate the first and second sampling values based on a plurality of sequential values of the sampled signal selected in response to the two consecutive positive values of the sampled input signal.

11. The timing recovery apparatus of claim 10, wherein the sample decision unit Is further configured to,
   store the plurality of sequential values in response to, and including, the two consecutive positive values of the sampled input signal,
   generate the first sampling value based on a first portion of the stored values, and
   generate the second sampling value based on a second portion of the stored values.

12. The timing recovery apparatus of claim 10, wherein the sample decision unit includes:
   a sign decision unit receiving each value of the sampled input signal and configured to detect when the two consecutive positive values of the sampled input signal have been received;
   a shift register configured to store a plurality of sequentially-received values of the sampled input signal in response to the two consecutive positive values;
   a first average arithmetic unit configured to convert all negative values in the first portion of stored values to positive values, average the values in the first portion of stored values to generate a first average value, and output the first average value as the first sampling value; and
   a second average arithmetic unit configured to convert all negative values in the second portion of stored values to positive values, average the values in the second portion of stored values to generate a second average value, and output the second average value as the second sampling value.

13. The timing recovery apparatus of claim 10, wherein the phase compensation unit outputs the difference between the target slope and the calculated sampling slope divided by a slope interval as the phase compensation signal, the slope interval being calculated by dividing a difference between a maximum value and a minimum value of the calculated slope by a number of phase compensation steps.

14. The timing recovery apparatus of claim 13, wherein the maximum value is a sum of the first sampling value and the second sampling value and the minimum value is a negative sum of the first sampling value and the second sampling value.

15. The timing recovery apparatus of claim 10, further comprising:
   a gain arithmetic unit configured to calculate an input signal gain corresponding to a sum of the first sampling value and the second sampling value;
   a gain difference arithmetic unit configured to calculate a difference between the calculated input signal gain and a target gain; and
   a gain compensation decision unit configured to generate a gain control signal controlling the input signal gain based on the difference between the calculated input signal gain and the target gain.

16. A timing recovery apparatus comprising:
   a sample decision unit configured to generate a first sampling value and a second sampling value based on a sampled input signal, the input signal being sampled according to a phase interval of a sampling clock;
   a slope arithmetic unit configured to calculate a sampling slope corresponding to a difference between the first sampling value and the second sampling value;
   a slope difference arithmetic unit configured to calculate a difference between a target slope and the calculated sampling slope;
   a phase compensation unit configured to generate a phase compensation signal based on at least the difference between the target slope and the calculated sampling slope; and
   a gain arithmetic unit configured to calculate an input signal gain corresponding to a sum of the first sampling value and the second sampling value; wherein
      the phase compensation unit is configured to generate the phase compensation signal based on the difference between the calculated sampling slope and the target slope, the input signal gain, and a target gain.

17. The timing recovery apparatus of claim 16, wherein the sample decision unit is configured to,
   detect when two consecutive values of the sampled input signal are positive, and
   generate the first and second sampling values based a plurality of sequential values of the sampled signal selected in response to the two consecutive positive values of the sampled input signal.

18. The timing recovery apparatus of claim 16, wherein the sample decision unit is further configured to,
   store a plurality of sequential values of the sampled input signal in response to, and including, two consecutive positive values of the sampled signal,
   generate the first sampling value based on a first portion of the stored values, and
   generate the second sampling value based on a second portion of the stored values.

19. The timing recovery apparatus of claim 16, wherein the sample decision unit includes:
   a sign decision unit configured to detect when two consecutive positive values of the sampled input signal have been received;
   a shift register configured to store a plurality of sequentially-received values of the sampled input signal in response to the two consecutive positive values;
   a first average arithmetic unit configured to convert all negative values in the first portion of stored values to positive values, average the values in the first portion of stored values to generate a first average value, and output the first average value as the first sampling value; and
   a second average arithmetic unit configured to convert all negative values in the second portion of stored values to positive values, average the values in the second portion of stored values to generate a second average value, and output the second average value as the second sampling value.

20. The timing recovery apparatus of claim 16, wherein the phase compensation unit is configured to,
   multiply the target slope by a ratio of the calculated input signal gain to a target gain to compensate the target slope, and
   divide the difference between the compensated target slope and the calculated sampling slope by a slope Interval to generate the phase compensation signal, the slope interval being calculated by dividing a difference between a maximum value and a minimum value of the calculated sampling slope by a number of phase compensation steps.

21. The timing recovery apparatus of claim 20, wherein the maximum value is a sum of the first sampling value and the second sampling value and the minimum value is a negative sum of the first sampling value and the second sampling value.

22. The timing recovery apparatus of claim 16, further comprising, a gain difference arithmetic unit configured to calculate a difference between the calculated input signal gain and a received target gain, and a gain compensation decision unit configured to generate a gain control signal controlling the input signal gain based on the difference between the calculated input signal gain and the target gain.

23. A timing recovery apparatus for performing the timing recovery method of claim 1.

24. The timing recovery method of claim 1, wherein the generating is performed at a sample decision unit, the calculating is performed at a slope arithmetic unit, and the compensating is performed at a phase compensation unit.

25. The timing recovery method of claim 5, wherein the generating is performed at a sample decision unit, the calculating is performed at a slope arithmetic unit, the compensating and multiplying is performed at a phase compensation unit, and the calculating is performed at a gain arithmetic unit.

* * * * *